United States Patent
Abe et al.

(10) Patent No.: US 7,209,826 B2
(45) Date of Patent: Apr. 24, 2007

(54) FUEL PROPERTIES ESTIMATION FOR INTERNAL COMBUSTION ENGINE

(75) Inventors: Kazuhiko Abe, Kawasaki (JP); Takashi Nakazawa, Kawasaki (JP); Hatsuo Nagaishi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/227,263

(22) Filed: Sep. 16, 2005

(65) Prior Publication Data

US 2006/0009903 A1 Jan. 12, 2006

Related U.S. Application Data

(62) Division of application No. 10/768,662, filed on Feb. 2, 2004, now Pat. No. 6,975,933.

(30) Foreign Application Priority Data

| Feb. 13, 2003 | (JP) | ............................ 2003-034444 |
| Feb. 13, 2003 | (JP) | ............................ 2003-034445 |
| Mar. 25, 2003 | (JP) | ............................ 2003-081804 |

(51) Int. Cl.
*B60T 7/12* (2006.01)
*F02B 75/12* (2006.01)

(52) U.S. Cl. ................ 701/109; 123/1 A; 123/672

(58) Field of Classification Search ............ 123/1 A, 123/494, 575, 672, 679, 693, 694; 701/109, 701/114, 103, 104; 73/35.02, 53.05, 118.1
See application file for complete search history.

(56) References Cited

U.S. PATENT DOCUMENTS 5,850,824 A 12/1998 Seitz et al.
6,257,218 B1 * 7/2001 Takagi et al. ............... 123/698
6,343,467 B1 2/2002 Muto et al.
6,363,313 B1 * 3/2002 Katoh et al. ................ 701/104
6,615,803 B2 9/2003 Kojima et al.
7,028,532 B2 * 4/2006 Shinzawa ................... 73/35.02
2002/0139111 A1 * 10/2002 Ueda et al. .................... 60/285
2003/0070666 A1 * 4/2003 Hosoi ......................... 123/672
2004/0099242 A1 5/2004 Nagaishi et al.
2004/0154386 A1 * 8/2004 Shinzawa ................... 73/118.1
2004/0154591 A1 * 8/2004 Shinzawa ............... 123/406.47
2004/0182378 A1 9/2004 Oshimi et al.
2004/0237951 A1 12/2004 Abe

FOREIGN PATENT DOCUMENTS

| JP | 2-112949 U | 9/1990 |
| JP | 3-179142 A | 8/1991 |
| JP | 4-224244 A | 8/1992 |
| JP | 5-5433 A | 1/1993 |
| JP | 05-005433 A | 1/1993 |
| JP | 5-163992 A | 6/1993 |
| JP | 8-177554 A | 7/1996 |

* cited by examiner

*Primary Examiner*—John T. Kwon
(74) *Attorney, Agent, or Firm*—Foley & Lardner LLP

(57) ABSTRACT

Fuel properties estimating apparatus for an internal combustion engine includes a controller to determine an estimated component concentration of a component in a fuel. The controller calculates an air-fuel correction quantity in accordance with an actual air fuel ratio of the engine; and calculates an air-fuel ratio sensitivity correction quantity from the air-fuel ratio correction quantity and a fuel properties correction quantity calculated from a most recent value of the component concentration. The controller then determines a new value of the estimated component concentration in accordance with the air-fuel ratio sensitivity correction quantity.

11 Claims, 7 Drawing Sheets

αt-ALC CHARACTERISTIC

ALC1 CALCULATION MAP

ALC2 CALCULATION MAP

ALC2 CALCULATION MAP

FUEL PROPERTIES ESTIMATION FOR INTERNAL COMBUSTION ENGINE

The present application is a divisional of U.S. application Ser. No. 10/768,662, filed Feb. 2, 2004, now U.S. Pat. No. 6,975,933 the entire contents of which is incorporated herein by reference.

BACKGROUND OF THE INVENTION

The present invention relates to fuel properties estimating apparatus and process for an internal combustion engine.

A vehicle known as flexible fuel vehicle (FFV) can run on a blend fuel of alcohol and gasoline as well as on gasoline. Alcohol fuel requires a large amount of fuel injection as compared to gasoline to obtain a given equivalence ratio because of the different number of atoms of C (carbon). Therefore, an engine system as shown in a Published Japanese Patent Application Publication No. H05(1993)-163992 (pages 1~4, and FIG. 5) is arranged to sense an alcohol concentration with an alcohol concentration sensor provided in a fuel tank or to estimate the alcohol concentration from an average value of air-fuel ratio feedback correction coefficient in the case of a failure of the alcohol concentration sensor.

SUMMARY OF THE INVENTION

It is an object of the present invention to provide fuel properties estimating apparatus and/or process for estimating properties of fuel more accurately and quickly. According to one aspect of the present invention, a fuel properties estimating apparatus for an internal combustion engine, comprises: a controller to determine an estimated component concentration of a component in a fuel for the engine, the controller being configured; to calculate an air-fuel correction quantity for correcting a fuel supply quantity for the engine, in accordance with an actual air fuel ratio of the engine; to calculate a fuel properties correction quantity in accordance with a most recent value of the component concentration; to calculate an air-fuel ratio sensitivity correction quantity from the air-fuel ratio correction quantity and the fuel properties correction quantity; and to calculate a new value of the estimated component concentration in accordance with the air-fuel ratio sensitivity correction quantity.

According to another aspect of the invention, a fuel properties estimating process comprises: calculating an air-fuel correction quantity for correcting a fuel supply quantity for the engine, in accordance with an actual air fuel ratio of the engine; calculating a fuel properties correction quantity in accordance with a most recent value of the component concentration; calculating an air-fuel ratio sensitivity correction quantity from the air-fuel ratio correction quantity and the fuel properties correction quantity; and calculating a new value of the estimated component concentration in accordance with the air-fuel ratio sensitivity correction quantity.

DETAILED DESCRIPTION OF THE INVENTION

Figure 1:
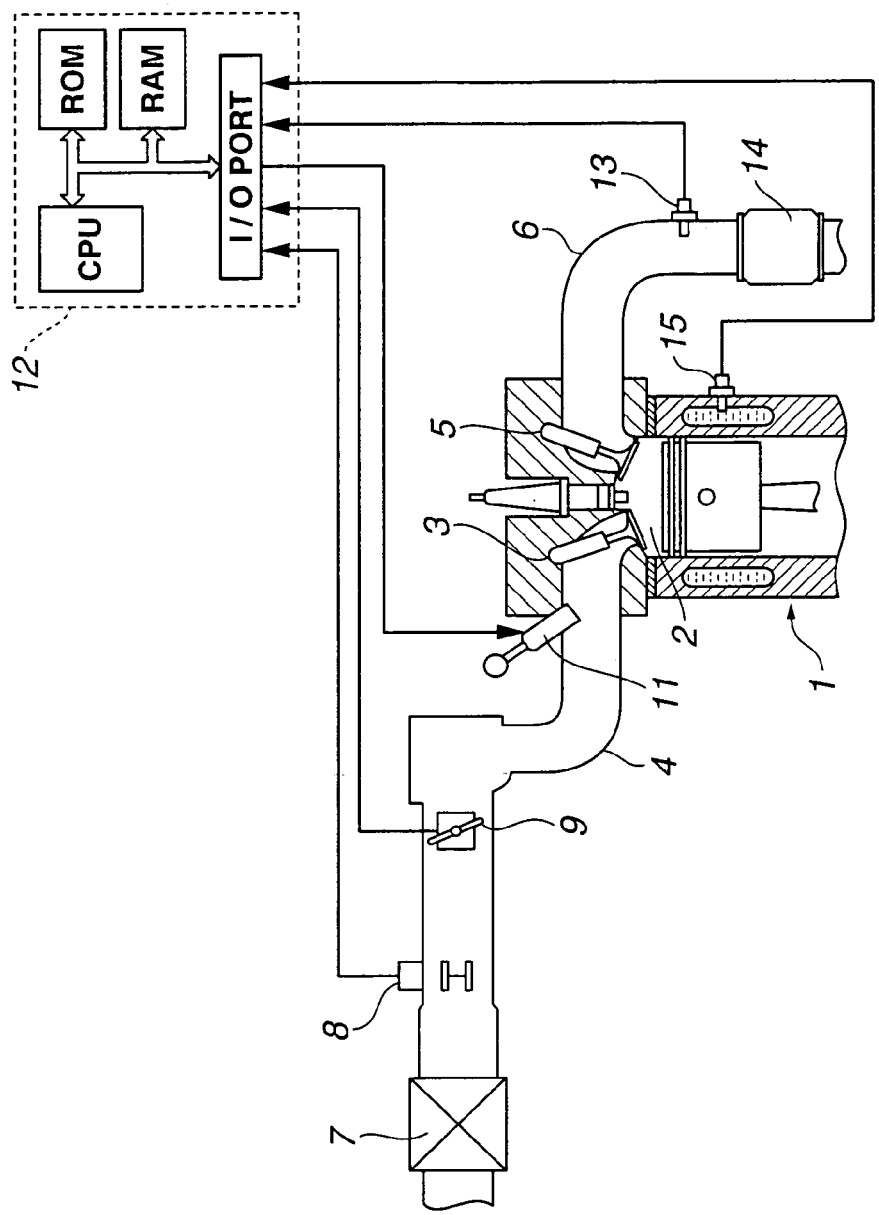
FIG. 1 is a schematic view showing an engine system serving as fuel properties estimating apparatus according to a first embodiment of the present invention.

FIG. 1 shows an engine system, serving as fuel properties (composition) estimating apparatus, according to a first embodiment of the present invention. An engine in this example is of a type capable of using a fuel containing alcohol.

An engine main block 1 includes at least one combustion chamber 2 with which an intake passage 4 is connected through an intake valve 3, and an exhaust passage 6 is connected through an exhaust valve 5.

In intake passage 4, there are provided an air cleaner 7, an air flowmeter 8 for sensing an intake air quantity, a throttle valve 9 for regulating the intake air quantity, and a fuel injector 11 for injecting fuel in the intake air.

An engine control unit (ECU) 12 produces a fuel injection command signal, and commands fuel injector 11 to inject fuel into the intake air to achieve a desired air-fuel ratio in accordance with engine operating conditions.

In exhaust passage 6, there are provided an oxygen sensor 13 for sensing an oxygen concentration in the exhaust gas mixture, and a three-way catalyst 14. Oxygen sensor 13 serves as air-fuel ratio sensing means for enabling calculation of an exhaust air-fuel ratio.

Three-way catalyst 14 can convert harmful emissions of hydrocarbons (HC), carbon monoxide (CO), and oxides of nitrogen (NOx) into less harmful gases with a maximum conversion efficiency in a window of the air-fuel ratio around the stoichiometry. Therefore, ECU 12 controls the air-fuel ratio of the engine in a feedback control mode based on the output of oxygen sensor 13 located on the upstream side of three-way catalyst 14 so that the actual air-fuel ratio swings periodically within the air fuel ratio window.

A water temperature sensor 15 senses the temperature of an engine cooling water in engine main block 1. ECU 12 is connected with this sensor, and arranged to receive information from this sensor.

Fuel containing alcohol requires a large amount of fuel injection as compared to ordinary gasoline to obtain a given equivalence ratio because of the number of atoms of C (carbon), so that adjustment of the fuel injection quantity is required. Therefore, the engine system is arranged to predict the alcohol concentration of fuel accurately as quickly as possible, by utilizing the output signal of oxygen concentration sensor 13. In this embodiment, alcohol is a component in fuel, and the alcohol concentration is a component concentration estimated by the system.

Figure 2:
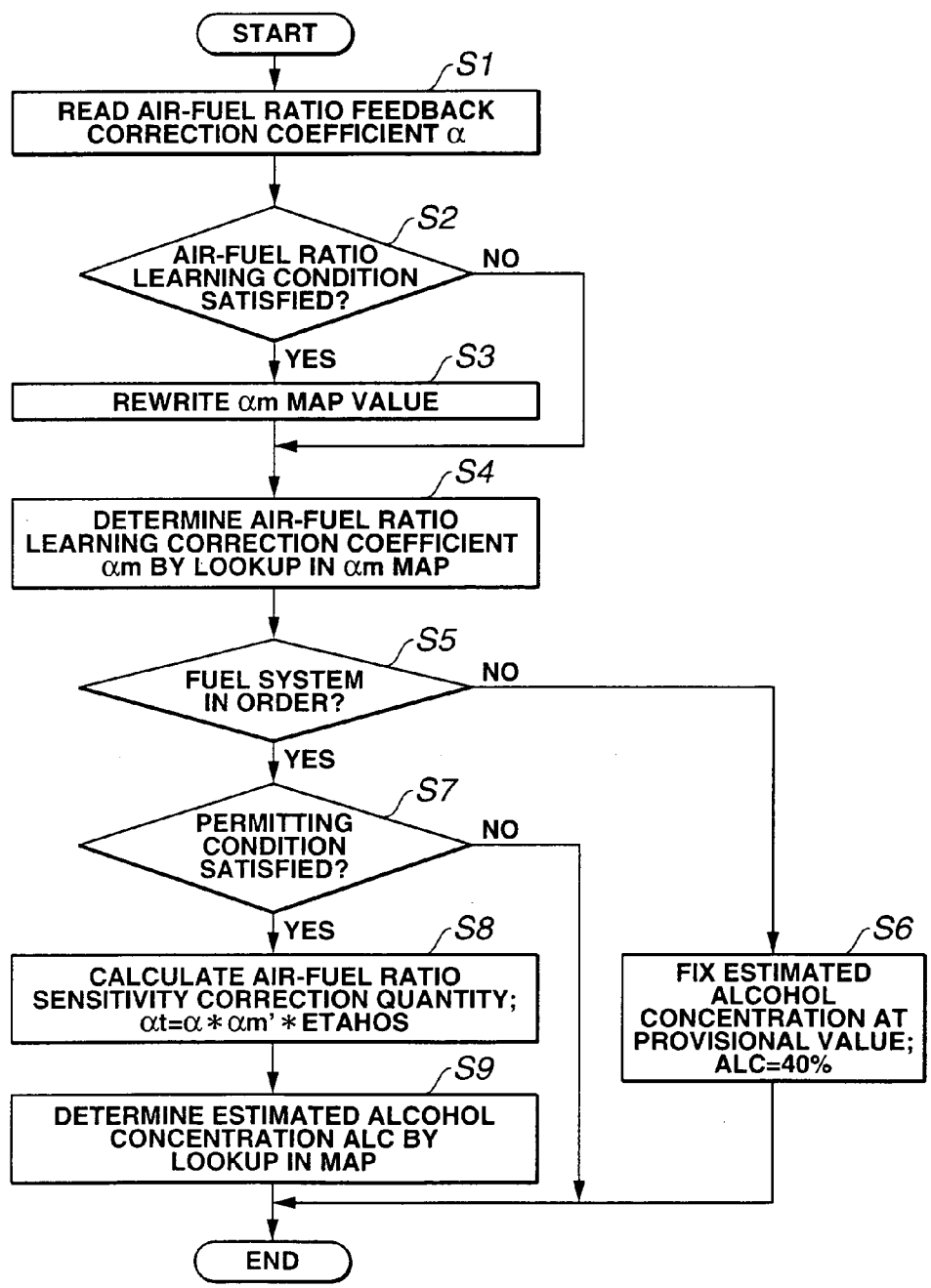
FIG. 2 is a flowchart showing a fuel properties estimating process according to the first embodiment.

According to the first embodiment, the engine system estimates the alcohol concentration in the fuel, as a single component concentration by following a process shown in FIG. 2.

Step S1 reads an air-fuel ratio feedback coefficient α (as an air-fuel ratio correction quantity) calculated from the output of oxygen concentration sensor 13.

Step S2 examines whether an air-fuel ratio learning condition is satisfied or not. When the learning condition is satisfied, the process proceeds to step S3, rewrites a map value in an αm calculation map for each operating region at S3, and then proceeds to step S4. When the learning condition is not satisfied, the process proceeds directly to S4 without performing the map rewriting operation of S3. In this example, αm is an air-fuel ratio learning correction coefficient (as the air-fuel ratio correction quantity). The air-fuel ratio feedback correction coefficient α and air-fuel ratio learning correction coefficient αm are parameters used for the feedback air-fuel ratio control. The fuel injection quantity is corrected in accordance with the air-fuel ratio feedback correction coefficient α and air-fuel ratio learning correction coefficient αm. This embodiment can employ various known methods for calculating the air-fuel ratio feedback correction coefficient α and air-fuel ratio learning correction coefficient αm.

Step S4 determines a value of αm in each operating region by lookup in the current αm map for each operating region.

Step S5 examines whether a fuel system for the engine is in a normal state. If there is a failure in the fuel system including oxygen sensor 13, air flowmeter 8, fuel injectors 11, water temperature sensor 15 and a canister purge system (not shown), then the program proceeds from S5 to S6. Step S6 fixes an estimated alcohol concentration ALC at a provisional value (40%) to prevent improper estimation of alcohol concentration, and to enable restart of the engine and sustenance of engine rotation after a start.

In this example, the provisional value in S6 is 40% which is intermediate between E85 fuel (ethanol concentration=85%) and E0 fuel (ethanol concentration=0). However, the provisional value is not limited to 40%.

When there is no failure in the devices in the fuel system, the program proceeds from S5 to S7 to examine whether an estimation permitting condition is satisfied or not. In this example, step S7 checks the engine cooling water temperature, elapsed time from a start of the engine, progress of the air-fuel ratio learning control, and history of refueling to determine whether the estimation permitting condition is satisfied. When the estimation permitting condition is satisfied, the program proceeds from S7 to S8. If the estimation permitting condition is not satisfied, the program ends without performing the alcohol concentration estimation.

Step S8 calculates an air-fuel ratio sensitivity correction total quantity αt from the air-fuel ratio feedback coefficient α, air-fuel learning correction coefficient αm and a quantity ETAHOS, according to the following equation.

$$\alpha t = \alpha \times \alpha m' \times ETAHOS \quad (1)$$

Quantity ETAHOS is a fuel properties correction quantity determined from a previous value (most recent value) of the estimated alcohol concentration ALC which is currently stored as ALC. In this example, fuel properties correction quantity ETAHOS is a previous value of air-fuel ratio sensitivity correction total quantity αt calculated from the stored most recent value of ALC inversely by using a map of FIG. 3.

In the equation (1), αm' is an average of αm values in representative speed load regions. In this example, the average αm' of αm is determined from the αm values of four speed load regions. It is desirable to select, as the representative four regions, regions which are used relatively frequently by the engine.

Figure 3:
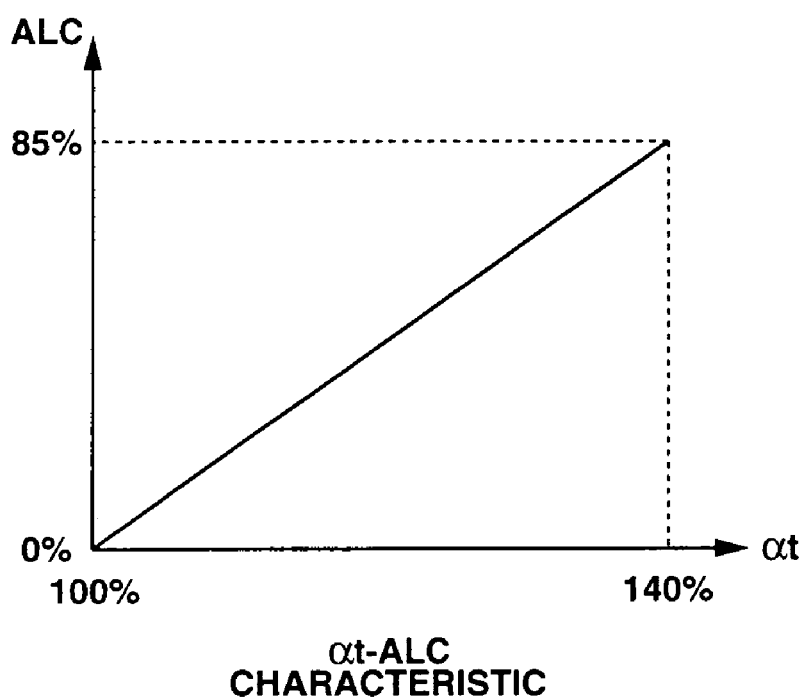
FIG. 3 is a graph showing a characteristic of an estimated alcohol concentration ALC and an air-fuel ratio sensitivity correction total quantity $\alpha t$, used in the process of FIG. 2.

Step S9 calculates a new value of the estimated alcohol concentration ALC from the air-fuel ratio sensitivity correction total quantity αt calculated at S8, by using the map shown in FIG. 3. The new value of estimated alcohol concentration ALC calculated at S9 is stored in place of the most recent value in a memory section in ECU 12 until next calculation of ALC at S9.

In the example shown in FIG. 3, the estimated alcohol concentration ALC varies continuously with the air-fuel ratio sensitivity correction total quantity αt, to achieve correction of the fuel injection quantity in accordance with a deviation of the actual air-fuel ratio calculated from the output of oxygen sensor 13 from a target air-fuel ratio, to control the actual air-fuel ratio at or near the stoichiometric ratio. In a region (of αt≧100%) in which the air-fuel ratio is on the lean side with respect to the stoichiometric air-fuel ratio, the alcohol concentration ALC of this is increased linearly substantially in proportion to the air-fuel ratio sensitivity correction total quantity αt, as shown in FIG. 3. In a region (of αt<100%) in which the air-fuel ratio is on the rich side with respect to the stoichiometric air-fuel ratio, the estimated alcohol concentration ALC is equal to 0%. In the example of FIG. 3, the estimated alcohol concentration ALC is 0% when αt=100%; and ALC is 85% when αt=140%.

The fuel properties estimating apparatus of the illustrated example includes at least an air-fuel ratio correction quantity calculating means corresponding to S1~S4 of FIG. 3; a fuel system device failure detecting means corresponding to S5; a provisional component concentration estimating means corresponding to S6; a fuel properties correction quantity calculating means corresponding to S8; an air-fuel ratio sensitivity correction total quantity calculating means corresponding to S8; and a nonprovisional component concentration estimating means corresponding to S9.

The thus-constructed fuel properties estimating system determines a new value of the estimated component concentration of a component such as alcohol in fuel, by using the fuel properties correction quantity ETAHOS based on a previous value of the estimated component concentration ALC, the air-fuel ratio feedback coefficient α, and the air-fuel learning correction coefficient αm. Therefore, the estimating system can reduce an error of the estimated component concentration from the actual concentration rapidly, and achieve accurate estimation of a component concentration for accurate combustion control to minimize deterioration of exhaust performance and drivability. The quick estimation of component concentration according to this embodiment makes it possible to produce a quick responsive control action such as an action to stop operation to minimize engine performance deterioration.

In the case of failure of one of the fuel system devices, the estimating system fixes the estimated component concentration ALC at the predetermined (provisional) value (40%), and thereby prevents incorrect estimation. By using the provisional concentration value set at a level enabling a start of the engine, the estimating system can prevent the vehicle from becoming unable to start because of errors in the estimation of alcohol concentration ALC. In this example, by employing the provisional value (40%) intermediate between ethanol concentration of 85% of E85 fuel and ethanol concentration of 0% of E0 fuel, the vehicle can start even if the actual fuel is E85 or E0.

The air-fuel ratio correction quantity includes the air-fuel ratio feedback correction coefficient α. Therefore, the estimating system can detect concentration changes and transient state due to fuel stirring after fueling, and fuel transportation delay in fuel piping.

Moreover, the air-fuel ratio correction quantity includes the air-fuel ratio learning correction coefficient αm. Therefore, the estimating system can reduce errors when fuel of the same alcohol concentration is used for a long period of time.

In the illustrated example, the air-fuel ratio sensitivity correction total quantity αt is calculated from air-fuel ratio feedback correction coefficient α and air-fuel ratio learning correction coefficient αm', both. However, it is optional to use either of α and αm', as shown in the following equation (2) or (3).

$$\alpha t = \alpha \times ETAHOS \quad (2)$$

$$\alpha t = \alpha m' \times ETAHOS \quad (3)$$

The equation (2) including only α is obtained by setting αm' to one in the before-mentioned equation (1). Equation (3) including only αm' is obtained by setting α to one.

Figure 4:
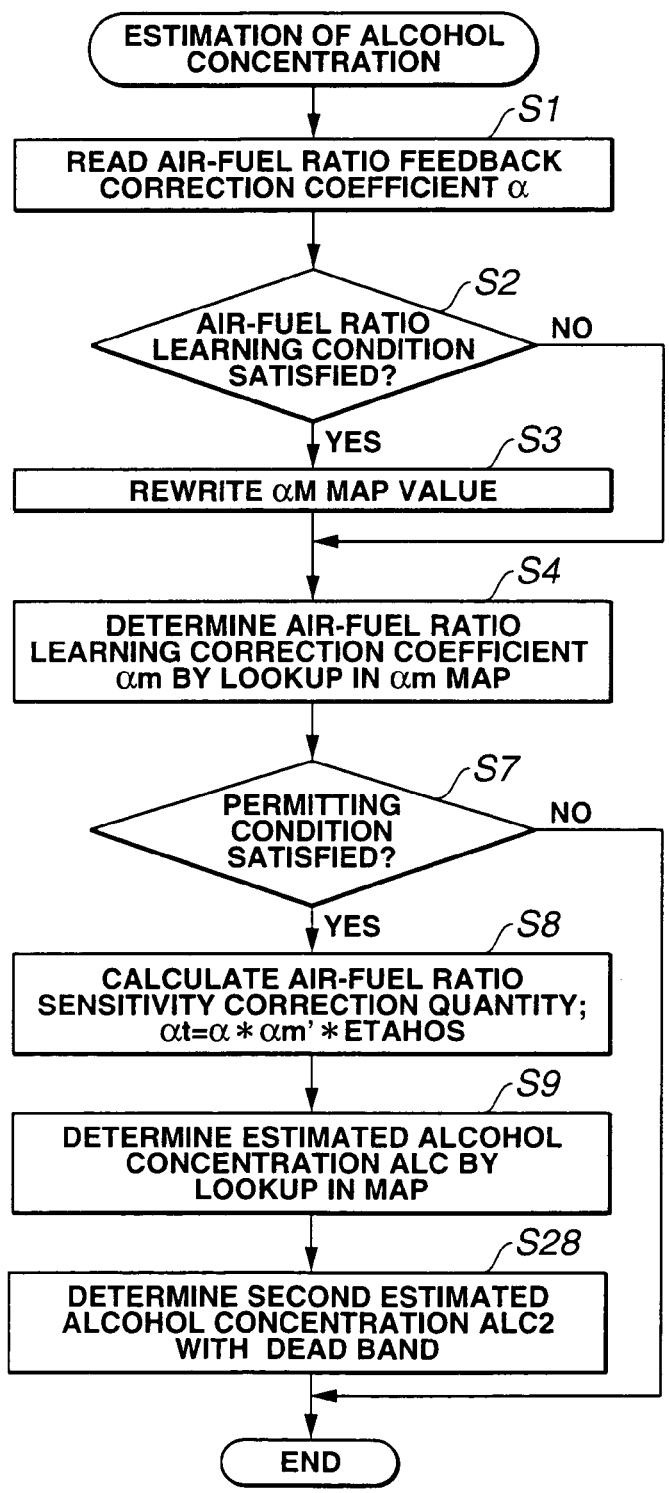
FIG. 4 is a flowchart showing a fuel properties estimating process according to a second embodiment of the present invention.

FIGS. 4, 5, 6 and 7 show a second embodiment of the present invention. An engine system serving as fuel properties estimating apparatus according to the second embodiment is substantially identical in construction to the engine system shown in FIG. 1. FIG. 4 shows a fuel properties estimating process performed by the system according to the second embodiment.

Steps S1~S4 and S7~S9 in FIG. 4 are substantially identical, respectively, to S1~S4, and S7~S9 of FIG. 2. In the example of FIG. 4, steps S5 and S6 of FIG. 2 are eliminated.

Figure 5:
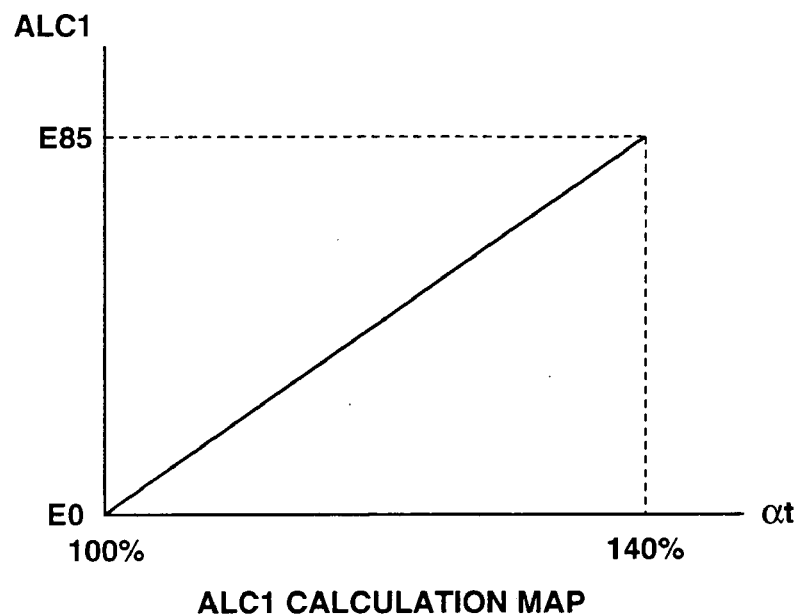
FIG. 5 is a graph showing a characteristic of an ALC1 calculation map used in the process of FIG. 4.

Step S9 of FIG. 4 is to determine a new value of a first estimated alcohol concentration ALC1 from the air-fuel ratio sensitivity correction total quantity αt calculated at S8, by using an ALC1 calculation map shown in FIG. 5 in the same manner as in S9 of FIG. 2 and FIG. 3. The new value of estimated alcohol concentration ALC1 calculated at S9 is saved in place of the most recent value of ALC1 in the memory section in ECU 12 until next calculation of ALC1 at S9.

In the example shown in FIG. 5, the estimated alcohol concentration ALC1 increases linearly with the air-fuel ratio sensitivity correction total quantity αt, as in FIG. 3, in the region (αt≧100%) in which the air-fuel ratio is on the lean side with respect to the stoichiometric air-fuel ratio. In the region (αt<100%) in which the air-fuel ratio is on the rich side with respect to the stoichiometric air-fuel ratio, the estimated alcohol concentration ALC1 is invariably equal to 0%. In the example of FIG. 5, the first estimated alcohol concentration ALC1 is 0% (E0) when αt=100%; and ALC1 is 85% (E85) when αt=140%.

Step S28 follows S9, as shown in FIG. 4. Step S28 calculates a new value of a second estimated alcohol concentration ALC2 from the first estimated alcohol concentration ALC1 calculated at S9, by using an ALC2 calculation map shown in FIG. 6. The new value of second estimated alcohol concentration ALC2 calculated at S28 is stored as ALC2, in the memory section in ECU 12 until next calculation of ALC2 at S28. Step S28 corresponds to means for estimating a second component concentration ALC2, or for calculating a second estimated component concentration ALC2.

Figure 6:
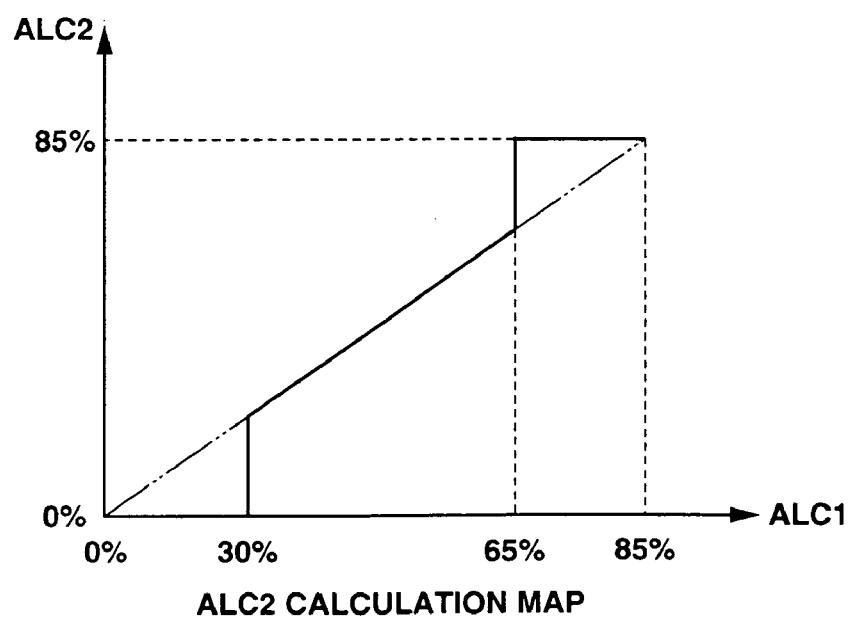
FIG. 6 is a graph showing a characteristic of an ALC2 calculation map having dead bands, used in the process of FIG. 4.

This ALC2 calculation map of FIG. 6 is a characteristic for calculating ALC2 from ALC1, and this characteristic of ALC2 has at least one dead band with respect to ALC1. In other words, the ALC2 calculation map has the dead band in which second alcohol concentration ALC2 is substantially constant regardless of changes in the air-fuel ratio sensitivity correction total quantity. The dead band is provided in a predetermined region of the air-fuel ratio sensitivity correction total quantity on a lean side on which the exhaust air-fuel ratio is lean with respect to the stoichiometric air-fuel ratio. In the example shown in FIG. 6, second estimated alcohol concentration ALC2 is invariably equal to 0% in a region of first estimated alcohol concentration ALC1 from 0% to 30%, and ALC2 is invariably equal to 85% in a region of first estimated alcohol concentration ALC1 from 65% to 85%.

This characteristic of FIG. 6 is set to provide stable control values (control constants) when gasoline (E0 fuel having ethanol concentration of 0%) is used or when standardized blend fuel (gasoline-alcohol blend fuel) such as E85 fuel having ethanol concentration of 85% is used. The above-mentioned control values (control constants) includes at least one of control constant about the ignition timing, constant about correction of wall flow of fuel, constant about cold enrichment, and constant about ternary point adjustment of lambda control or a target air-fuel ratio in the air-fuel ratio control. When these quantities are varied, the repeatability of emission control becomes worse. The problem can be solved by the setting of the dead band.

The ALC2 calculation map of this example includes a dead band at or near the ethanol concentration of E0 fuel, and a dead band at or near the ethanol concentration of E85, both available on the market. Therefore, the result (ALC2) of estimation corresponds stably to the alcohol concentration of a commercially available fuel within a limited range of the air-fuel ratio sensitivity correction quantity αt.

By calculating a plurality of estimated alcohol concentrations such as ALC1 and ALC2, the estimating system can provide results of estimation adequate for respective different combustion parameters. First estimated alcohol concentration ALC1 can be used for combustion parameters requiring accurate adjustment based on an alcohol concentration in fuel. Second estimated alcohol concentration ALC2 can be used for combustion parameters, such as wall flow correction quantity, cold enrichment quantity, target air-fuel ratio and ignition timing, requiring stable performance for commercially available fuel, or guarantee of deviation of estimated concentration with respect to actual concentration.

The thus-constructed fuel properties estimating system according to the second embodiment determines a new value of first estimated component concentration ALC1 of a component such as alcohol in fuel, by using the fuel properties correction quantity ETAHOS based on a previous value of the estimated component concentration ALC1, the air-fuel ratio feedback coefficient α, and the air-fuel learning correction coefficient αm, as in the first embodiment. Therefore, the estimating system can reduce an error of the estimated component concentration from the actual concentration rapidly, and achieve accurate estimation of a component concentration for accurate combustion control to minimize deterioration of exhaust performance and drivability.

The air-fuel ratio correction quantity includes the air-fuel ratio feedback correction coefficient α, as in the first embodiment. Therefore, the estimating system can detect concentration changes and transient state due to fuel stirring after fueling, and fuel transportation delay in fuel piping.

Moreover, the air-fuel ratio correction quantity includes the air-fuel ratio learning correction coefficient αm, as in the first embodiment. Therefore, the estimating system can reduce errors when fuel of the same alcohol concentration is used for a long period of time. In the second embodiment, too, it is optional to use either of α and αm', as shown in the equation (2) or (3).

Figure 7:
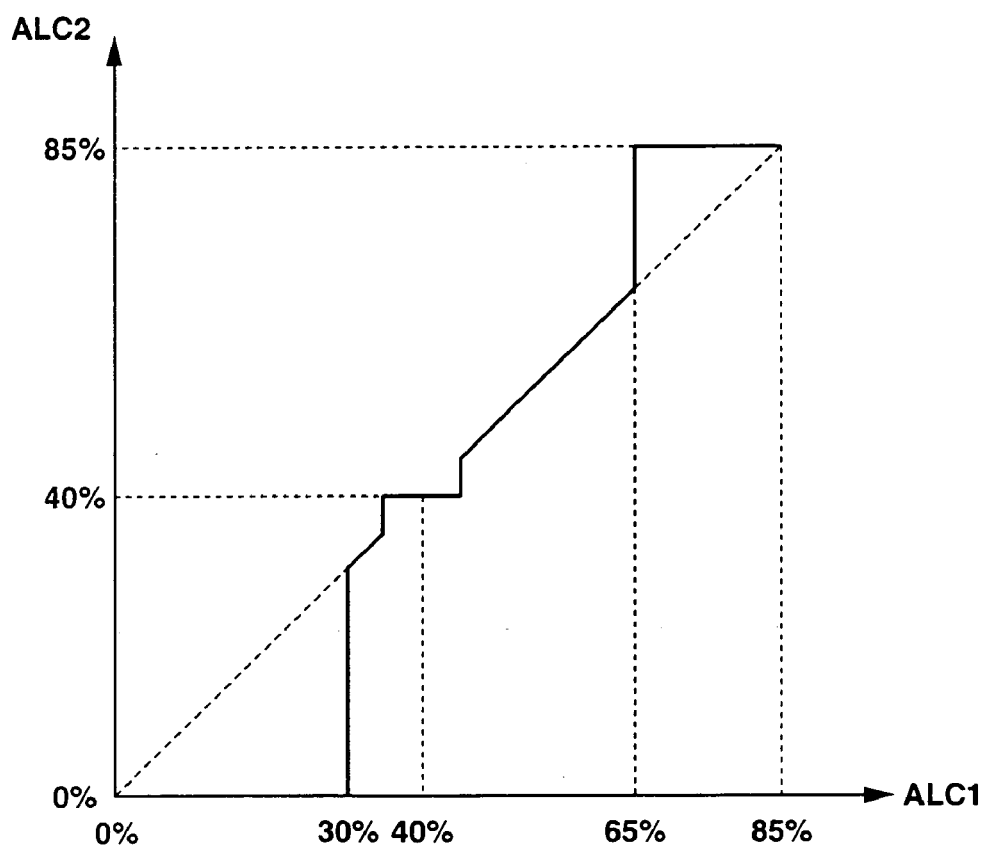
FIG. 7 is a graph showing a characteristic of an ALC2 calculation map having three dead bands, which can be used in the process of FIG. 4, in place of FIG. 6.

In the example of FIG. 6, the ALC2 calculation map includes two dead bands. Instead, it is optional to employ an ALC2 calculation map having three dead bands as shown in FIG. 7. In the example of FIG. 7, the second estimated alcohol concentration ALC2 is set invariably equal to 0% in an ALC1 region of ALC1 of 0%~30%; invariably equal to 40% in a ALC1 region of 35%~45%; and invariably equal to 85% in an ALC1 region of 65%~85%.

Figure 8:
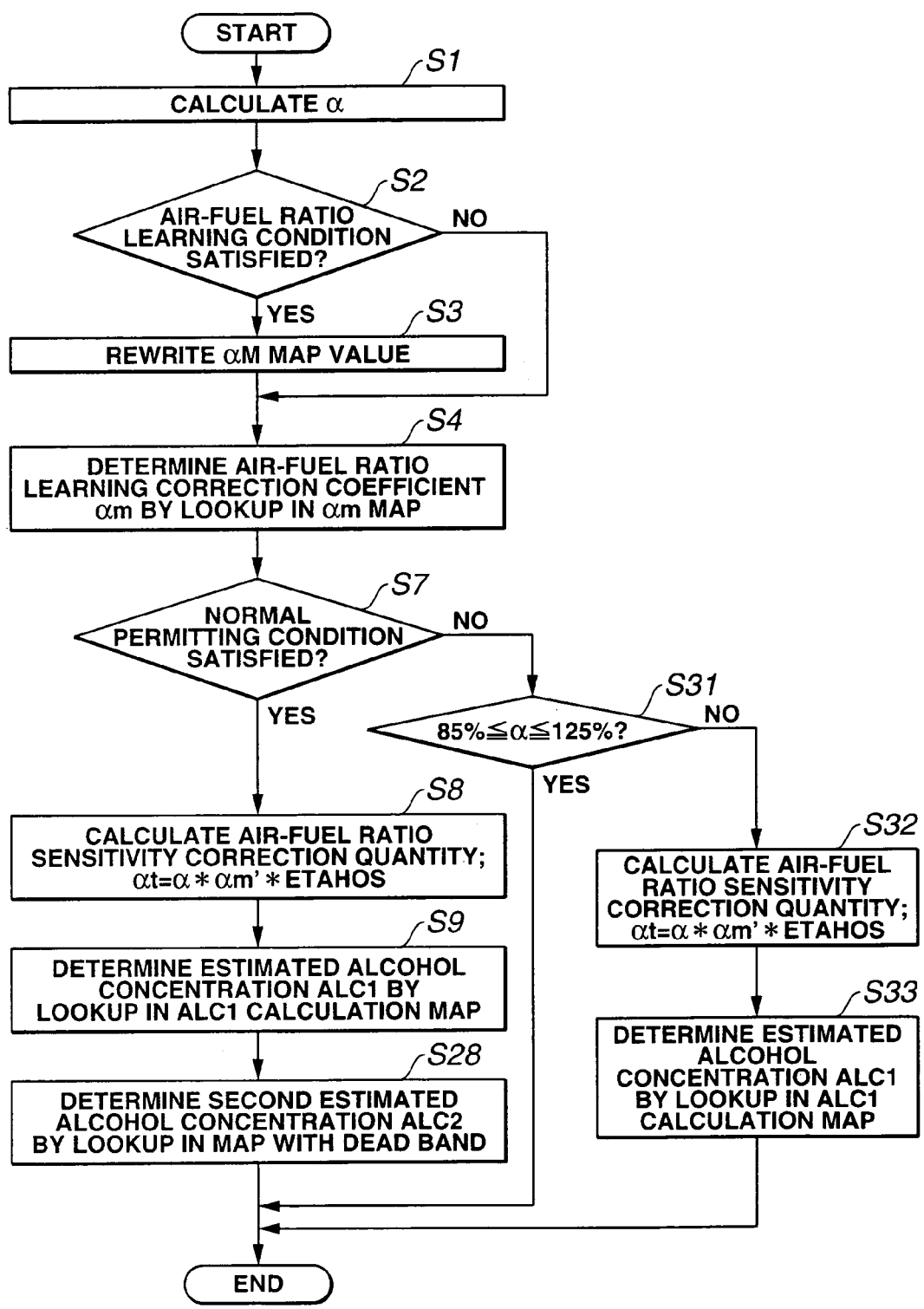
FIG. 8 is a flowchart showing a fuel properties estimating process according to a third embodiment of the present invention.

FIG. 8 shows a third embodiment of the present invention. An engine system serving as fuel properties estimating apparatus according to the third embodiment is substantially identical in construction to the engine system shown in FIG. 1. FIG. 8 shows a fuel properties estimating process performed by the system according to the third embodiment.

Steps S1~S4 and S7~S9 in FIG. 8 are substantially identical, respectively, to S1~S4, and S7~S9 of FIG. 1 and FIG. 4. Step S28 is substantially identical to S28 of FIG. 4. In FIG. 8, steps S31~S33 are added to the process of FIG. 4.

Step S1 calculates air-fuel ratio feedback coefficient α from the output of oxygen concentration sensor 13 or ascertains the calculated air-fuel ratio feedback coefficient. Step S2 examines whether the air-fuel ratio learning condition is satisfied or not. Step S3 rewrites a map value in the αm calculation map. When the learning condition is not satisfied, the process proceeds directly to S4. Step S4 determines air-fuel ratio learning correction coefficient αm, as in the preceding embodiments. The air-fuel ratio feedback correction coefficient α and air-fuel ratio learning correction coefficient am are air-fuel ratio correction quantities used for the feedback air-fuel ratio control.

After S4, step S7 examines whether a normal estimation permitting condition is satisfied or not. In this example, it is examined whether a disturbance affecting the exhaust air-fuel ratio is present or not. Step S7 of this examples checks the engine cooling water temperature, elapsed time from a start of the engine, progress of the air-fuel ratio learning control, and history of refueling to determine whether the estimation permitting condition is satisfied. Moreover, step S7 of this example checks whether a quantity of blowby gases is smaller than or equal to a predetermined value. When the estimation permitting condition is satisfied, the program proceeds from S7 to S8. If the estimation permitting condition is not satisfied, the program proceeds from S7 to step 31.

Step S8 calculates the air-fuel ratio sensitivity correction total quantity αt from air-fuel ratio feedback coefficient α, air-fuel learning correction coefficient αm and fuel properties correction quantity ETAHOS, according to the equation (1), as in the preceding embodiments. Step S9 calculates a new value of the first estimated alcohol concentration ALC1 from the air-fuel ratio sensitivity correction total quantity αt calculated at S8, by using the ALC1 calculation map shown in FIG. 5, as in the preceding embodiments. In this example, first estimated alcohol concentration ALC1 is used for correcting the base fuel injection quantity (calculated from a sensed engine speed and a sensed intake air quantity).

After S9, step S28 calculates a new value of second estimated alcohol concentration ALC2 from first estimated alcohol concentration ALC1 calculated at S9, by using ALC2 calculation map shown in FIG. 6, as in the second embodiment.

When the normal permitting condition is not satisfied, the program proceeds from S7 to step S31 corresponding to second permitting condition discriminating means. Step S31 examines whether the air-fuel ratio feedback correction coefficient α calculated at S1 is within a predetermined range, which, in this example, is 85%~125%. The process proceeds to step S32 when air-fuel ratio feedback correction coefficient α is outside the range of 85%~125%. When air-fuel ratio feedback correction coefficient α is greater than or equal to 85% (0.85) and smaller than or equal to 125% (1.25), then the process ends without performing the estimation of alcohol concentration. In this case, the normal permitting condition is so set that the normal permitting condition is not satisfied when the air-fuel ratio feedback correction coefficient α is outside the range of 85%~125%.

When 85%≦α≦125%, and hence the answer of S31 is YES, the engine system uses the first and second estimated alcohol concentrations ALC1 and ALC2 for engine control without updating ALC1 and ALC2.

Step S32 calculates the air-fuel ratio sensitivity correction total quantity αt from the air-fuel ratio feedback coefficient α, air-fuel learning correction coefficient αm and a quantity ETAHOS, according to the equation (1) as in S8.

Step S33 calculates a new value of the first estimated alcohol concentration ALC1 from the air-fuel ratio sensitivity correction total quantity αt calculated at S32, by using the ALC1 calculation map shown in FIG. 5. The new value of first estimated alcohol concentration ALC1 calculated at S33 is stored in place of the most recent value in the memory section in ECU 12. In this case, the estimating system updates only the first estimated alcohol concentration ALC1. The second estimated alcohol concentration ALC2 is not updated, and held unchanged in the memory section.

In this example, first estimated alcohol concentration ALC1 obtained at S33 is used for correcting the base fuel injection quantity. First estimated alcohol concentration ALC1 obtained at S9 is saved in the memory section until a new value of ALC1 is calculated by a next operation of S9 or S33. Second estimated alcohol concentration ALC1 obtained at S28 is saved in the memory section until a new value of ALC2 is calculated by a next operation of S28.

The estimating system according to the third embodiment calculates and updates both the first and second estimated alcohol concentrations ALC1 and ALC2 when the normal permitting condition of S7 is satisfied; and calculates and updates only the first estimated alcohol concentration ALC1 when the estimation is permitted at S31. Second estimated alcohol concentration ALC2 is not updated when the normal permitting condition of S7 is not satisfied, even if the permitting condition of S31 is satisfied.

The estimated alcohol concentration stored in ECU 12 deviates largely from the actual alcohol concentration in a fuel tank, for example, immediately after replenishment of fuel. In such a case, the estimating system of the third embodiment calculates and updates the first estimated alcohol concentration ALC1 even if the normal permitting condition of S7 is not satisfied because of existence of disturbance to the estimation. Therefore, the engine system can correct the base fuel injection quantity accurately with first estimated alcohol concentration ALC1. The engine system can avoid insufficiency in control quantity in air-fuel ratio feedback control; and prevent deterioration of driving performance and exhaust performance by preventing overlean condition and over-rich condition in a combustion chamber.

Second estimated alcohol concentration ALC2 is not updated in the program section of S31~S33. By updating second estimated alcohol concentration ALC2 only in a reliable condition in this way, the estimating system can provide adequate value of ALC2 adequate for the intended purpose of ALC2.

A fuel properties estimating apparatus according to one aspect of the invention comprises: a component concentration estimating controller to calculate an air-fuel correction quantity for correcting a fuel injection quantity for the engine, in accordance with an actual air fuel ratio of the engine; to calculate a fuel properties correction quantity in accordance with a most recent value of the component concentration; to calculate an air-fuel ratio sensitivity correction quantity from the air-fuel ratio correction quantity and the fuel properties correction quantity; and to calculate a new value of the estimated component concentration in accordance with the air-fuel ratio sensitivity correction quantity.

A fuel properties estimating apparatus according to another aspect of the invention comprises: an air-fuel ratio sensor to sense an actual exhaust air-fuel ratio of the engine; and a controller to determine an estimated component concentration of a component in a fuel for the engine in accordance with a control parameter determined from the actual exhaust air-fuel ratio, the controller being configured to determine the estimated component concentration with a dead band to hold the estimated component concentration substantially constant without regard to variation in the control parameter in a predetermined region of the control parameter.

A fuel properties estimating apparatus according to still another aspect of the present invention comprises: an air-fuel ratio sensor to sense an actual exhaust air-fuel ratio of the engine; and a controller to determine an estimated component concentration of a component in a fuel for the engine in accordance with the actual exhaust air-fuel ratio, the controller being configured to calculate an air-fuel correction quantity for correcting a fuel supply quantity for the engine, in accordance with the actual air fuel ratio of the engine; to examine whether the air-fuel ratio correction quantity is outside a predetermined region; and to determine the estimated component quantity when the air-fuel ratio correction quantity is outside the predetermined region.

This application is based on a prior Japanese Patent Application No. 2003-34444 filed on Feb. 13, 2003; a prior Japanese Patent Application No. 2003-34445 filed on Feb. 13, 2003; and a prior Japanese Patent Application No. 2003-81804 filed on Mar. 25, 2003. The entire contents of these Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A fuel properties estimating apparatus for an internal combustion engine, the fuel properties estimating apparatus comprising:
an air-fuel ratio sensor to sense an actual exhaust air-fuel ratio of the engine; and
a controller to determine an estimated component concentration of a component in a fuel for the engine in accordance with a control parameter determined from the actual exhaust air-fuel ratio, the controller being configured to determine the estimated component concentration with a dead band to hold the estimated component concentration substantially constant without regard to variation in the control parameter in a predetermined region of the control parameter.

2. The fuel properties estimating apparatus as claimed in claim 1, wherein the controller is configured to hold the estimated component concentration substantially constant without regard to variation in the air-fuel ratio sensitivity correction quantity in a predetermined region of the air fuel ratio sensitivity correction quantity on a lean side of the actual air-fuel ratio with respect to a stoichiometric ratio.

3. The fuel properties estimating apparatus as claimed in claim 2, wherein the controller is configured to determine the estimated component concentration with a dead band to hold the estimated component concentration substantially constant without regard to variation in the air-fuel ratio sensitivity correction quantity in the predetermined region to conform to a commercially available blend fuel.

4. The fuel properties estimating apparatus as claimed in claim 2, wherein the controller is configured:
to determine a first component concentration and a second component concentration as the estimated component concentration in accordance with the air-fuel ratio sensitivity correction quantity;
to increase the first component concentration in proportion to the air-fuel ratio sensitivity correction quantity; and
to determine the second component concentration with a dead band to hold the second component concentration substantially constant without regard to variation in the air-fuel ratio sensitivity correction quantity in the predetermined region of the air fuel ratio sensitivity correction quantity.

5. The fuel properties estimating apparatus as claimed in claim 4, wherein the controller is configured to use the first component concentration for control of a first combustion parameter of the engine and the second component concentration for control of a second combustion parameter of the engine.

6. The fuel properties estimating apparatus as claimed in claim 5, wherein the second combustion parameter is one of a wall flow correction, a cold enrichment quantity, a target air-fuel ratio and an ignition timing.

7. The fuel properties estimating apparatus as claimed in claim 5, wherein the first combustion parameter is a basic fuel injection quantity for the engine.

8. The fuel properties estimating apparatus as claimed in claim 1, wherein the component in the fuel for the engine is alcohol.

9. A vehicle, comprising:
an internal combustion engine;
an air-fuel ratio sensor to sense an actual exhaust air-fuel ratio of the engine; and
a controller to determine an estimated component concentration of a component in a fuel for the engine in accordance with a control parameter determined from the actual exhaust air-fuel ratio, the controller being configured to determine the estimated component concentration with a dead band to hold the estimated component concentration substantially constant without regard to variation in the control parameter in a predetermined region of the control parameter.

10. A method of controlling the fuel injection in an internal combustion engine, comprising:

sensing an actual exhaust air-fuel ratio of the engine;

determining an estimated component concentration of a component in a fuel for the engine in accordance with a control parameter determined from the actual exhaust air-fuel ratio by determining the estimated component concentration with a dead band to hold the estimated component concentration substantially constant without regard to variation in the control parameter in a predetermined region of the control parameter; and adjusting a fuel injection quantity based on the estimated component concentration.

11. The method of claim 10, wherein adjusting the fuel injection quantity based on the estimated component concentration is performed to maintain a determined equivalence ratio.

* * * * *